Nov. 3, 1925.          1,560,126
R. WEDEBERG
BATTERY TERMINAL CONNECTION COVER
Filed June 7, 1923
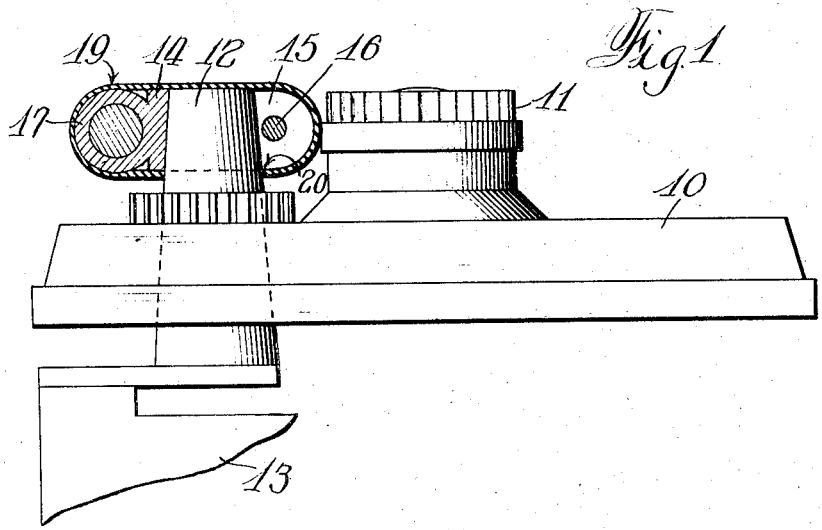
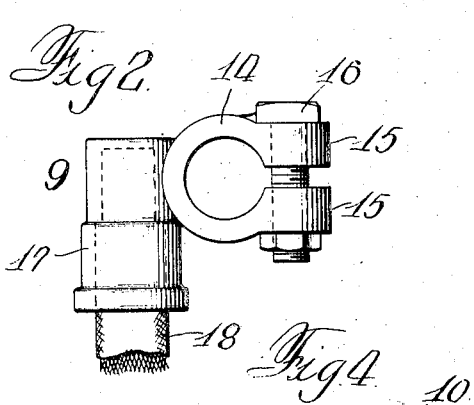
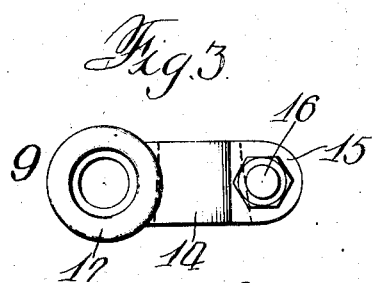
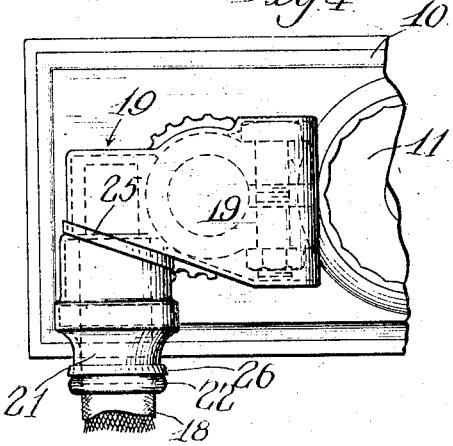
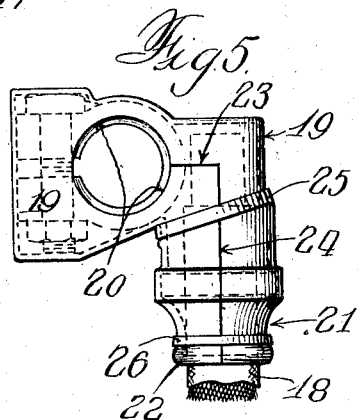
Witness:
Davt S. Magnuson
Inventor:
Reuben Wedeberg
By Luther Johns Atty.

Patented Nov. 3, 1925.

1,560,126

UNITED STATES PATENT OFFICE.

REUBEN WEDEBERG, OF CHICAGO, ILLINOIS.

BATTERY-TERMINAL-CONNECTION COVER.

Application filed June 7, 1923. Serial No. 643,845.

*To all whom it may concern:*

Be it known that I, REUBEN WEDEBERG, a citizen of the United States, residing at Chicago, Cook County, Illinois, have invented a certain new and useful Battery-Terminal-Connection Cover, of which the following is a specification.

The present invention relates to protective covers for the terminal connections of electric batteries. As illustrated herein its application is to a standard form of battery terminal connection used in automobiles. These standard terminal connections are made of brass coated with lead, but such coating is insufficient to provide the desired protection.

The need for this improvement arises from the fact that these terminal connections are subject to quite rapid destruction, disintegration, and failure through the corroding effect of the battery acid. It is practically impossible to avoid the destructive presence of the acid and acid fumes, at least as these automobile batteries are now being constructed and for a long time past have been made. Among the causes of the corrosive action are such facts as that too much water is frequently added to the battery, causing excessive leakage, leakage due to the shaking and jolting of the car, poor sealing of the battery, leakage through the filling cap, looseness of the terminal plugs due to various causes, for instance the cables pulling on them, and, notably, the presence of fumes coming from the vent hole in the filling cap, especially during the battery-charging operation when the engine is running.

As a result of the corrosion mentioned frequent cleaning of the connections and their replacement from time to time is called for, and much trouble is constantly being experienced by reason of poor electrical union at the place referred to.

The trouble is not only with the connection itself, but frequently the insulation of the cable becomes cracked and broken where the cable is secured to the connection, or for other reasons the electric wires of the cable become exposed, and since these cable wires are relatively small they disintegrate quite rapidly in the presence of the acid and much trouble is experienced also at that joint.

The objects of the present invention are to provide a simple, relatively cheap, and easily applied form of protective covering for such terminal connections, and for the cables also, to the end that the destruction and failure of these parts by the acid fumes is avoided, with a consequent saving of time, labor and cost involved in frequent cleaning and replacement of parts, and also whereby the inconveniences and disadvantages of poor electrical connections at the battery are overcome.

Still other objects and advantages will appear hereinafter.

In the accompanying drawings, which form a part of this specification, Figure 1 is a side view of a battery cover showing a battery post and in medial longitudinal section a terminal connection thereon and the present protective covering on the connection; Fig. 2 is a top view and Fig. 3 is an end view of the terminal connection shown in Fig. 1; Fig. 4 is a top view of the battery cover fragmentarily shown with the present improvements applied to the terminal connection; and Fig. 5 is a bottom view of the cover as applied to the connection.

The battery cover 10 having the filling cap 11 and the terminal post 12 connected to a grid 13 are of standard construction in automobile battery practice. The standard terminal connection 9, well shown in Figs. 2 and 3, is a brass casting coated with lead. It is provided with a split clamping ring 14 having bolt flanges 15 and a bolt 16 therethrough adapted to tighten the connection firmly upon the lead post 12. It is also provided with a cable socket 17 into which the cable 18 projects and into which it is secured as by means of melted lead.

My improved cover may conveniently be formed of rubber compound and it preferably has considerable elasticity. It may be formed, however, of other compounds or substances having battery-acid-resisting properties. Elastic rubber is advantageous owing to the facility with which it may be molded into the desired shape, because of its high battery-acid-resisting properties, and because of the convenience with which it may be applied and maintained in its desired position. It is made to conform substantially with the general shape of the terminal connection, and preferably also so as to extend beyond the connection sufficiently to encompass the end portions of the cable 18. Its shape as applied to the standard connection illustrated is well shown in Figs.

1, 4 and 5, from which it will be noted that it has top, side, and bottom walls which follow substantially closely the contour of the article encompassed by it, although it is not essential that it follow the contour of the article as closely as is shown in these drawings. It is preferable, however, that it fit snugly upon the article, especially at its openings, so as to exclude acid or acid fumes from contact with the enclosed metal. From Figs. 1 and 5 it will be noted that the cover is provided with a bottom opening at 20 adapted to register with the opening in the terminal connection and to encompass the plug 12 and fit snugly upon it when the parts are applied in their operative position.

From Figs. 4 and 5 it will well be noted that the cover 19 has an extension at 21, which is of tubular shape and which encompasses the end portion of the cable 18. This extension 21 is preferably formed with an annular rib 22 adapted to strengthen the free edge of the device there and to provide it with better constriction properties for binding it firmly upon the cable. From Fig. 5 it will be noted that the normally lower wall of the protective covering is split or divided on a broken line 23, 24 leading from the opening 20 and extending first to about the middle of the cylindrical part and then extending as shown by the line 24 to the end of the structure. This split or division 23, 24 enables the elastic or yielding structure to be sprung apart whereby after the terminal connection is firmly applied to the plug 12 the cap or cover 19 may be positioned upon it and adjusted so that it fits snugly thereon and snugly around the plug 14, and due to the fact that it is a molded or formed article and has elasticity, especially when made of rubber, the edges of the bottom part adjust themselves closely along the lines of the split 23, 24. I prefer, however, to provide other means for maintaining a tight joint at the split as 23, 24, and to this end may use a rubber band 25, which is preferably applied on diagonal lines whereby its effect is to pull or draw the parts together both at the line 23 and at the line 24. An additional rubber band 26 is adapted to hold the parts together with a tight joint upon the cable 18.

Should it become desirable to remove the terminal connection the rubber bands 25 and 26 can be stripped along and upon the cable 18 and the cover device removed by simply spreading the bottom wall parts and slipping it off of the cable and connection.

I contemplate as being included in this invention such changes and departures from what is herein specifically illustrated and described as fall within the scope of the appended claims.

I claim:

1. A protective cover for a battery-terminal connection of the character described having a clamping ring for a battery post and having a cable socket member and a cable therein and being adapted to fit upon the up-standing terminal post of a battery, said cover comprising a hollow body of thin and flexible battery-acid-resisting material having integral top, side and bottom walls and having an opening for the connection stem in the bottom wall, said walls being arranged whereby the cover conforms substantially to the shape of the terminal connection and whereby it is adapted to enclose and surround the body of said connection closely, said cover having a portion thereof divided whereby cover parts may be spread apart to apply the cover to the connection.

2. A protective cover for a battery-terminal connection of the character described having a clamping ring for a battery post and having a cable socket member and a cable therein and being adapted to fit upon the up-standing terminal post of a battery, said cover comprising a hollow body of thin and flexible material having integral top, side and bottom walls and having an opening for the connection stem in the bottom wall, said walls being arranged whereby the cover conforms substantially to the shape of the terminal connection and whereby it is adapted to enclose and surround the body of said connection closely, the bottom wall of said cover being divided in a line leading from said connection stem opening whereby cover parts may be spread apart to apply the cover to the connection, and means for holding the cover parts closely together at the place where it is divided.

3. A protective cover for a battery-terminal connection and cable of the character described having a clamping ring for a battery post and having a cable socket member and a cable therein and being adapted to fit upon the up-standing terminal post of a battery, said cover comprising a hollow body of thin and flexible material having integral top, side and bottom walls and having an opening for the connection stem in the bottom wall, said walls being arranged whereby the cover conforms substantially to the shape of the terminal connection and whereby it is adapted to enclose and surround the body of said connection closely and also the end portion of the cable adjacent to where it is secured to the connection, said cover having a portion thereof, including that portion adapted to surround the cable, divided whereby cover parts may be spread apart to apply the cover to the connection and cable, and means for holding the cover parts closely together where divided.

REUBEN WEDEBERG.